US011005545B2

(12) United States Patent
Murakami et al.

(10) Patent No.: US 11,005,545 B2
(45) Date of Patent: May 11, 2021

(54) BASE STATION AND CONTROL METHOD THEREOF

(71) Applicant: NIPPON TELEGRAPH AND TELEPHONE CORPORATION, Tokyo (JP)

(72) Inventors: Tomoki Murakami, Yokosuka (JP); Koichi Ishihara, Yokosuka (JP); Yasushi Takatori, Yokosuka (JP); Hirantha Abeysekera, Yokosuka (JP); Mamoru Akimoto, Yokosuka (JP); Masato Mizoguchi, Yokosuka (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 112 days.

(21) Appl. No.: 16/480,122

(22) PCT Filed: Jan. 25, 2018

(86) PCT No.: PCT/JP2018/002295
§ 371 (c)(1),
(2) Date: Jul. 23, 2019

(87) PCT Pub. No.: WO2018/139539
PCT Pub. Date: Aug. 2, 2018

(65) Prior Publication Data
US 2019/0386724 A1 Dec. 19, 2019

(30) Foreign Application Priority Data
Jan. 27, 2017 (JP) .............................. JP2017-013222

(51) Int. Cl.
*H04B 7/06* (2006.01)
*H04W 68/00* (2009.01)
(Continued)

(52) U.S. Cl.
CPC ........ *H04B 7/0602* (2013.01); *H04W 68/005* (2013.01); *H04W 72/0406* (2013.01);
(Continued)

(58) Field of Classification Search
None
See application file for complete search history.

(56) References Cited

U.S. PATENT DOCUMENTS

2007/0224953 A1    9/2007  Nakagawa et al.
2012/0274154 A1*  11/2012  Deluca .................... H02J 50/80
                                                                      307/149

(Continued)

FOREIGN PATENT DOCUMENTS

JP        2005341531 A     12/2005
WO     WO-2016/175144 A1  11/2016

OTHER PUBLICATIONS

Vivek P. Mhatre, et al.; "Interference Mitigation through Power Control in High Density 802.11 WLANs"; IEEE Infocom 2007 Proceedings, 2007.
(Continued)

*Primary Examiner* — Gregory B Sefcheck
*Assistant Examiner* — Amarnauth G Persaud
(74) *Attorney, Agent, or Firm* — Harness, Dickey & Pierce, P.L.C.

(57) ABSTRACT

Included are n antenna sets; n antenna switch units; n signal change units each changing a combination of one or more of a phase, a timing, a frequency, and a power of each signal transmitted/received in n antennas being selected from the antenna sets; a notification unit outputting a notification signal, in which control information on the antenna switch units and the signal change units according to a target terminal being a destination/source of the signals transmitted/received in the n antennas, are arranged according to a
(Continued)

switch time of each of the antenna switch units and a change time of each of the signal change units; and a control unit sequentially starting control of switching by each of the antenna switch units and control of changing by each of the signal change units in order in which the control information on the each unit in the notification signal is notified.

8 Claims, 9 Drawing Sheets

(51) Int. Cl.
*H04W 72/04* (2009.01)
*H04W 84/12* (2009.01)
*H04W 88/08* (2009.01)

(52) U.S. Cl.
CPC ........ *H04W 72/0453* (2013.01); *H04W 84/12* (2013.01); *H04W 88/08* (2013.01)

(56) References Cited

U.S. PATENT DOCUMENTS

| | | | |
|---|---|---|---|
| 2013/0128762 A1* | 5/2013 | Guo | H04B 7/061 370/252 |
| 2016/0226570 A1* | 8/2016 | Nicholls | H04B 7/0897 |
| 2017/0041038 A1* | 2/2017 | Kirkpatrick | H01Q 3/36 |
| 2018/0040964 A1 | 2/2018 | Benjebbour et al. | |
| 2018/0145740 A1* | 5/2018 | Tani | |
| 2018/0198204 A1* | 7/2018 | Kovacic | H01Q 3/28 |
| 2019/0124587 A1* | 4/2019 | Bergman | H04W 48/16 |

OTHER PUBLICATIONS

Wan Choi, et al.; "Downlink Performance and Capacity of Distributed Antenna Systems in a Multicell Environment"; IEEE Transactions on Wireless Communications, vol. 6, No. 1, pp. 69-73, Jan. 2007.

International Search Report (in English and Japanese) issued in International Patent Application No. PCT/JP2018/002295, dated Apr. 3, 2018.

International Preliminary Report on Patentability regarding PCT/JP2018/002295, including the English translation of the Written Opinion, dated Aug. 8, 2019.

* cited by examiner

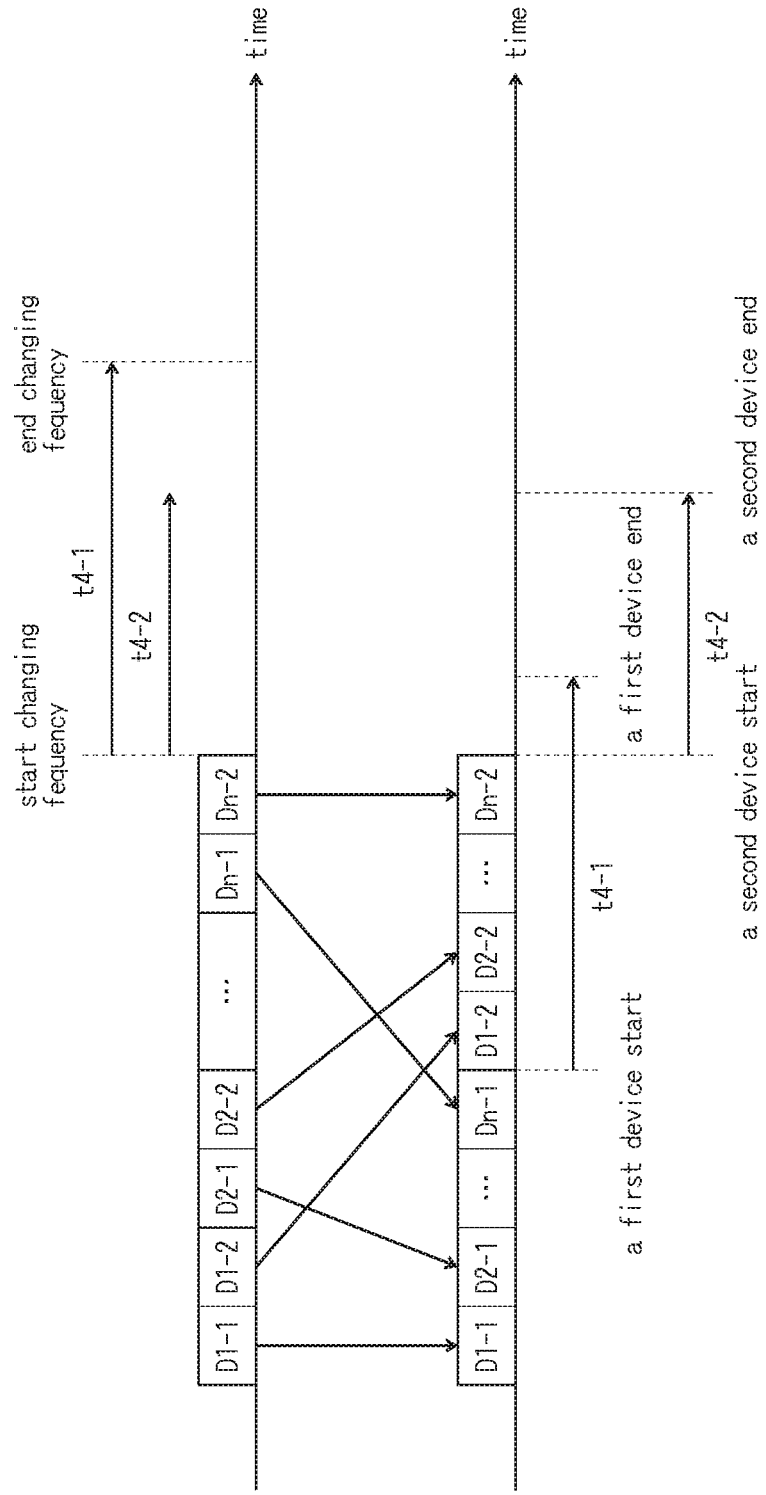
F I G. 6

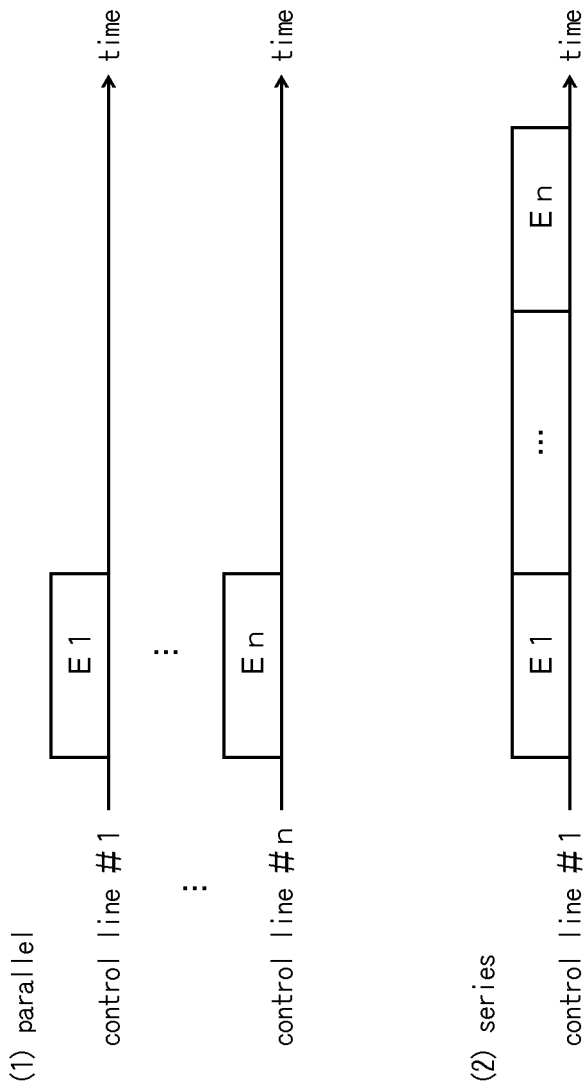

BASE STATION AND CONTROL METHOD THEREOF

CROSS REFERENCE TO RELATED APPLICATIONS

This application is a U.S. National Stage Application claiming the benefit of prior filed International Application No. PCT/JP2018/002295 filed on Jan. 25, 2018, in which the International Application claims priority from Japanese Patent Application No. 2017-013222, filed on Jan. 27, 2017. The entire disclosures of the above applications are incorporated herein by reference.

TECHNICAL FIELD

The present invention relates to a base station that efficiently controls antenna switching and controls, in prescribed combination, a phase, a timing, a frequency, and a power of a signal that is transmitted or received in each antenna in the base station that performs wireless communication by sharing the same frequency channel as one or more terminals using a distributed antenna, and a method of controlling the base station.

BACKGROUND ART

In recent years, with the spread of a high-performance portable wireless terminal, such as a smartphone, wireless LANs in compliance with the IEEE 802.11 standard have come into wide use not only in companies and public spaces, but also in ordinary houses. As the wireless LANs in compliance with the IEEE 802.11 standard, there is a wireless LAN in compliance with the IEEE 802.11b/g/n standard that uses a 2.4 GHz band, and a wireless LAN in compliance with the IEEE 802.11a/n/ac standard that uses a 5 GHz band.

In the wireless LAN in compliance with the IEEE 802.11b standard or the IEEE 802.11g, 13 standard channels are prepared at intervals of 5 MHz in a bandwidth of 2400 MHz to 2483.5 MHz. However, when using multiple channels in the same place, in order to avoid interference, channels that are not in the same band are used. In such a case, a maximum of three channels are used, and up to four channels can be used at the same time, depending on the place where the channels are used.

In the wireless LAN in compliance with the IEEE 802.11a standard, in Japan, it is stipulated that 8 channels in bands that do not overlap in a bandwidth of 5170 MHz to 5330 MHz and 11 channels in bands that do not overlap in a bandwidth of 5490 MHz to 5710 MHz, totaling 19 channels, should be used. It is noted that in the IEEE 802.11a standard, a bandwidth per channel is set to 20 MHz.

A maximum transfer speed in the wireless LAN is 11 Mbps in the IEEE 802.11b standard and is 54 Mbps in the IEEE 802.11a standard or the IEEE 802.11g standard. However, the transfer speed here is a transfer speed on a physical layer. Because a transfer efficiency in the Medium Access Control (MAC) layer is actually approximately 50 to 70%, an upper limit value of actual throughput is approximately 5 Mbps in the IEEE 802.11b standard and is approximately 30 Mbps in the IEEE 802.11a standard or the IEEE 802.11g standard. Furthermore, if the number of wireless stations that are going to transmit information increases, the transfer speed further decreases.

For this reason, in the IEEE 802.11n standard that results from completion of the standardization in 2009, a channel bandwidth was broadened from 20 MHz, which had been set up to that time, to a maximum of 40 MHz, and the introduction of the Multiple input multiple output (MIMO) technology was determined. When all functions that are stipulated in the IEEE 802.11n standard are applied, and thus transmission or reception is performed, it is possible that, in a physical layer, a communication speed of a maximum 600 Mbps is realized.

Moreover, in the IEEE 802.11ac standard that results from completion of the standardization in 2013, a channel bandwidth was broadened to 80 MHz or a maximum of 160 MHz, or the introduction of the multi-user MIMO (MU-MIMO) transmission scheme to which Space Division Multiple Access (SDMA) is applied was determined. When all functions that are stipulated in the IEEE 802.11ac standard are applied, and thus the transmission or reception is performed, it is possible that, in the physical layer, a communication speed of a maximum approximately 6.9 Gbps is realized.

In this manner, in the wireless LAN, the communication speed that accompanies the development in the standard that results from the standardization was improved. However, if the same frequency channel is shared among multiple wireless stations, it is known that throughput decreases due to a decrease in the number of communication opportunities that accompanies an increase in the number of wireless stations. In contrast to this, a technology is studied in which a power that caused interference to each wireless station is suppressed by adaptively controlling a transmission power of a wireless station conforming with a situation of a communication partner, and in which, as a result, the number of opportunities of each wireless station to perform communication is increased (Non-Patent Document 1: Vivek P. Mhatre, Konstantina Papagiannaki, and Francois Baccelli, "Interference Mitigation through Power Control in High Density 802.11 WLANs", IEEE INFOCOM 2007-26th IEEE International Conference on Computer Communications IEEE, 2007). Examples of a method of controlling a transmission power include a method of controlling amplitude of a transmission signal using a power adjustment apparatus such as a variable resistor or a variable amplifier.

FIG. 7 illustrates an example of a configuration of a wireless communication system that is assumed according to the present invention.

In FIG. 7, base stations 10-1 and 10-2 that are connected to a network 30 are configured to use the same frequency channel and perform wireless communication with terminals 20 under the control of the base stations 10-1 and 10-2, respectively. Furthermore, each of the base stations 10-1 and 10-2 includes multiple antennas and is configured to perform MIMO communication with one or multiple terminals 20. Moreover, the base stations 10-1 and 10-2 also include a function of adjusting a transmission or reception power of each antenna according to the terminal that is a destination.

FIG. 8 illustrates an example of a configuration of a base station in the related art.

In FIG. 8, the base station includes n (n is an integer of two or more) antennas 101-1 to 101-$n$, power change units 102-1 to 102-$n$ that change a transmission power and a reception power, transmission and reception units 103-1 to 103-$n$ that perform transmission processing and reception processing of signals that are transmitted or received, respectively, in n antennas, a signal processing control unit 104 that performs conversion processing of a signal that is input or output into or from a network that is connected to the base station, and the signal that is transmitted or received in each of the n antennas, a power notification unit 105 that outputs a notification signal that includes an amount of power change by each of the power change units 102-1 to 102-*n* in accordance with a target terminal that is a destination or source of the signal that is transmitted or received, and a power control unit 106 that performs control of power changing by the power change units 102-1 to 102-*n* according to the notification signal. It is noted that the power notification unit 105 is present within the signal processing control unit 104.

The power notification unit 105 extracts transmission power information that corresponds to each antenna for the target terminal that is set in advance, before performing the transmission processing, and notifies the power control unit 106 of the transmission power information that corresponds to each antenna. According to the notification signal from the power notification unit 105, the power control unit 106 performs control in such a manner that the transmission powers are changed by the power change units 102-1 to 102-*n* that correspond to the antennas 101-1 to 101-*n*, respectively. The same is true for the control of the reception power of a reception signal. Accordingly, because optimal transmission power control is performed on the target terminal, it is possible that a power that causes interference to any other wireless station is suppressed at the same time and that the number of opportunities for the entire wireless communication system to perform communication is increased. Thus, an improvement in throughput is expected.

Moreover, as a technology that increases an effect of reducing the transmission power, progress has been made in a study on a distributed antenna technology that arranges multiple antennas that the base station has, in a distributed manner and thus shortens a distance between a base station antenna and a terminal antenna, thereby resulting in an increase in the reception power of each wireless station (Non-Patent Document 2: Wan Choi, and Jeffrey G. Andrews, "Downlink Performance and Capacity of Distributed Antenna Systems in a Multicell Environment", IEEE Transactions on Wireless Communications 6.1 (2007): 69-73). On the other hand, although the reception power that increased is reduced, it is possible that the same communication quality as in the related art is secured. Because of this, a further reduction in the transmission power is also possible.

DISCLOSURE

Problems to be Solved

The power control unit 106 performs control in such a manner that powers of signals that are transmitted or received in the antennas 101-1 to 101-*n* according to the target terminal are changed by the power change units 102-1 to 102-*n*, respectively, of the base station that is illustrated in FIG. 8. At this point, the amount of power change that corresponds to each antenna is generated in the power notification unit 105 of the signal processing control unit 104 according to the target terminal and the generated amount of power change is notified to the power control unit 106. As schemes for transfer of the notification signal that notifies the amount of power change that corresponds to each antenna, the following two methods are considered.

In a first scheme for the transfer of the notification signal, as illustrated in (1) of FIG. 9, pieces of power change control information E1 to En for controlling the power change units 102-1 to 102-*n*, using n control lines, respectively, are notified in parallel. In this case, the pieces of power change control information E1 to En can be notified in a short time from the power notification unit 105 to the power control unit 106, and changing of the power of the signal that is transmitted or received in each antenna can be realized at a high speed. However, because the n control lines are necessary, a problem of increasing a circuit scale and the cost occurs. Moreover, if the number of antennas of the base station increases greatly in the future, there is a need to solve this problem.

In a second scheme for the transfer of the notification signal, as illustrated in (2) of FIG. 9, the pieces of power change control information E1 to En for controlling the power change units 102-1 to 102-*n*, respectively, using one control line are notified in series. In this case, the number of control lines can be 1, but, depending on the number n of antennas, it takes time to notify all pieces of power change control information E1 to En. For example, there is a need to perform control to the precision of seconds or less to perform transmission power control on a per-wireless packet basis, and a problem of shortening the transfer time of the notification signal occurs.

Moreover, if the distributed antenna is used for the purpose of further increasing a transmission power control effect, there is a need for a configuration in which the distributed antenna is selected on a per-wireless packet basis. In this case, there is a need for addition of an antenna switch unit, and thus there is also a need for a control signal for controlling the antenna switch unit. Therefore, there is a need for not only an amount of power change that corresponds to each antenna but also a technology for efficiently notifying switch information for the antenna switch unit.

Furthermore, progress toward further improving communication quality has also been made in a study on a beamforming technology that controls the directivity of a radio wave depending on a change in a phase of a signal that is transmitted or received in each antenna. Attention has also been paid on the fact that, by using the beamforming technology, interference to an asymmetrical wireless station can be suppressed without greatly decreasing a reception power of a terminal in a direction that is a target. In addition, because a technology that avoids collision with a wireless packet by timing control of the transmission or reception, or a technology for frequency synchronization between antennas is also studied, there is a high likelihood that a phase, a timing, and a frequency for every antenna will also be control targets in the future. However, in order to control these change units, efficient notification of control information is indispensable.

Furthermore, there is a high likelihood that the antenna switch unit and each change unit that changes the phase, the timing, the frequency, and the power for every antenna will differ in terms of a reaction time from the starting of switching and changing operations to the ending of switching and changing operations. Because of this, control is also necessary considering the reaction time of each unit.

A proposition of the present invention is to provide a base station that is capable of performing at a high speed switching control and changing control of signals that are transmitted or received in multiple antennas, considering reaction times of each antenna switch unit and each change unit that changes the phase, the timing, the frequency, and the power of each signal, and a method of controlling the base station.

Means for Solving the Problems

According to a first invention, there is provided a base station in a wireless communication system in which the base station and one or more terminals share the same frequency channel, the base station includes n sets of antenna sets, where n is an integer of two or more, each of the antenna sets contains multiple antennas; n number of antenna switch units selecting one antenna from each of the antenna sets; n number of signal change units each changing a combination of one or more of a phase, a timing, a frequency, and a power of each signal transmitted or received in n number of antennas being selected from the antenna sets, respectively, in the antenna switch units; a notification unit outputting a notification signal, in which control information on the antenna switch units and the signal change units according to a target terminal being a destination or source of the signals transmitted or received in the n number of antennas, are arranged according to a switch time of each of the antenna switch units and a change time of each of the signal change units (reaction time of each unit); and a control unit sequentially starting control of switching by each of the antenna switch units and control of changing by each of the signal change units in order in which the control information on the each unit in the notification signal is notified.

In the base station according to the first invention, the notification unit is configured to arrange the control information on the each unit in the notification signal in order of decreasing amount of the reaction time of the each unit.

In the base station according to the first invention, the notification unit is configured to arrange the control information on the each unit in the notification signal so as to end the control of switching by each of the antenna switch units and the control of changing by each of the signal change units within a designated time.

In the base station according to the first invention, the notification unit is configured to reduce an amount of the control information on the each unit in the notification signal, and control unit, the antenna switch units, and the signal change units are configured to perform the control of switching and the control of changing, which correspond to the reduced amount of the control information.

In the base station according to the first invention, a change unit of at least one of the phase, the timing, the frequency, and the power of the signal change units is configured to connect multiple devices that differ in the reaction time; and the notification unit is configured to sequentially arrange the control information of the each unit in the notification signal starting from the control information on the devices having the longer reaction time.

According to a second invention, there is provided a control method of the base station according to the first invention, the method includes a step of causing the base station to extract a target terminal for which a signal input from an external network is destined, and to determine control information based on a signal format according to the target terminal, an antenna to which each of the antenna switch units switches, and an amount of change in the phase, the timing, the frequency, and the power by the each unit of the signal change units; a step of causing the notification unit to generate a notification signal in which the control information on the each unit, which corresponds to the target terminal is arranged according to the reaction time of the each unit, and to transmit the generated notification signal to the control unit; and a step of causing the control unit to start the control of switching by the antenna switch units and the control of changing by the signal change units at the same time that the control information on the each unit in the notification signal arrives, in which a signal is transmitted and received after the controlling of the antenna switch units and the signal change units is finished.

In the control method of the base station according to the second invention, the notification unit arranges the control information on the each unit in the notification signal in order of decreasing amount of the reaction time of the each unit.

In the control method of the base station according to the second invention, the notification unit arranges the control information on the each unit in the notification signal so as to end the control of switching by each of the antenna switch units and the control of changing by each of the signal change units within a designated time.

Effect

According to the present invention, a notification signal in accordance with reaction times of each antenna switch unit and each signal change unit with respect to a phase, a timing, a frequency, and a power is configured and control is started at the same time that control information for each of the switching and changing arrives. Thus, switching processing and changing processing of signals that are transmitted or received in multiple antennas can be performed at a high speed, and a high-speed signal can be dealt with.

BRIEF DESCRIPTION OF DRAWINGS

FIG. 6 is a diagram illustrating a fourth example of the configuration of the notification signal according to the present invention.

FIG. 9 is a diagram illustrating a scheme for transfer of the notification signal.

DETAILED DESCRIPTION OF THE EMBODIMENTS

Figure 1:
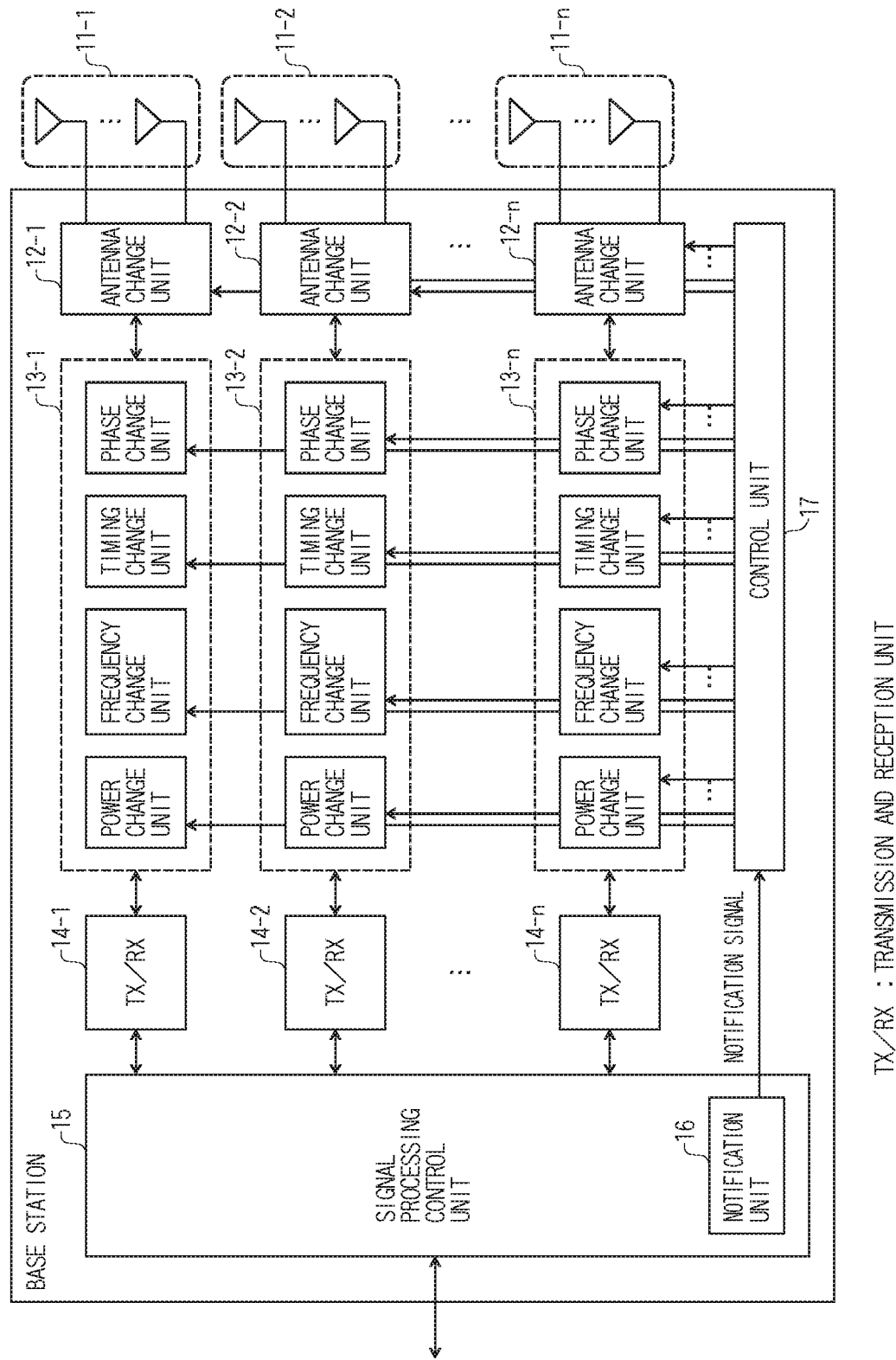
FIG. 1 is a diagram illustrating an example of a configuration of a base station according to the present invention.

FIG. 1 illustrates an example of a configuration of a base station according to the present invention.

In FIG. 1, antenna sets 11-1 to 11-$n$ of the base station are n sets of multiple antennas (n is an integer of two or more). Antenna switch units 12-1 to 12-$n$ select an antenna from each of the antenna sets that is, select n antennas in total. Signal change units 13-1 to 13-$n$ change phases, timings, frequencies, and powers of signals that are transmitted or received in the n antennas that are selected from the antenna sets, respectively. Transmission and reception units 14-1 to 14-$n$ performs transmission processing and reception processing of signals that are transmitted or received in the n antennas, respectively. A signal processing control unit 15 performs the conversion processing of a signal that is input and output into and form a network that is connected to the base station and a signal that is transmitted or received in each antenna. A notification unit 16 outputs a notification signal that includes pieces of control information for the antenna switch units 12-1 to 12-*n* and the signal change units 13-1 to 13-*n* in accordance with a target terminal that is a destination or source of signals which are transmitted or received. According to the notification signal, a control unit 17 controls switch processing by the antenna switch units 12-1 to 12-*n* and change processing by the signal change units 13-1 to 13-*n*.

It is noted that each antenna in the antenna sets 11-1 to 11-*n* may be arranged in a distributed manner. Furthermore, a configuration that has directivity which differs among the antennas may be employed.

One or all change units that make up the signal change units 13-1 to 13-*n*, which are responsible for a phase, a timing, a frequency, and a power are change targets according to the target terminal, and the control information of the notification signal is configured according to a combination of units that are the change targets among the units. Furthermore, the change units differ in terms of a reaction time from the starting of a change operation to the ending of the change operation, and each change unit may have a configuration in which multiple devices that differ in terms of the reaction time are connected in a multistage manner.

Figure 2:
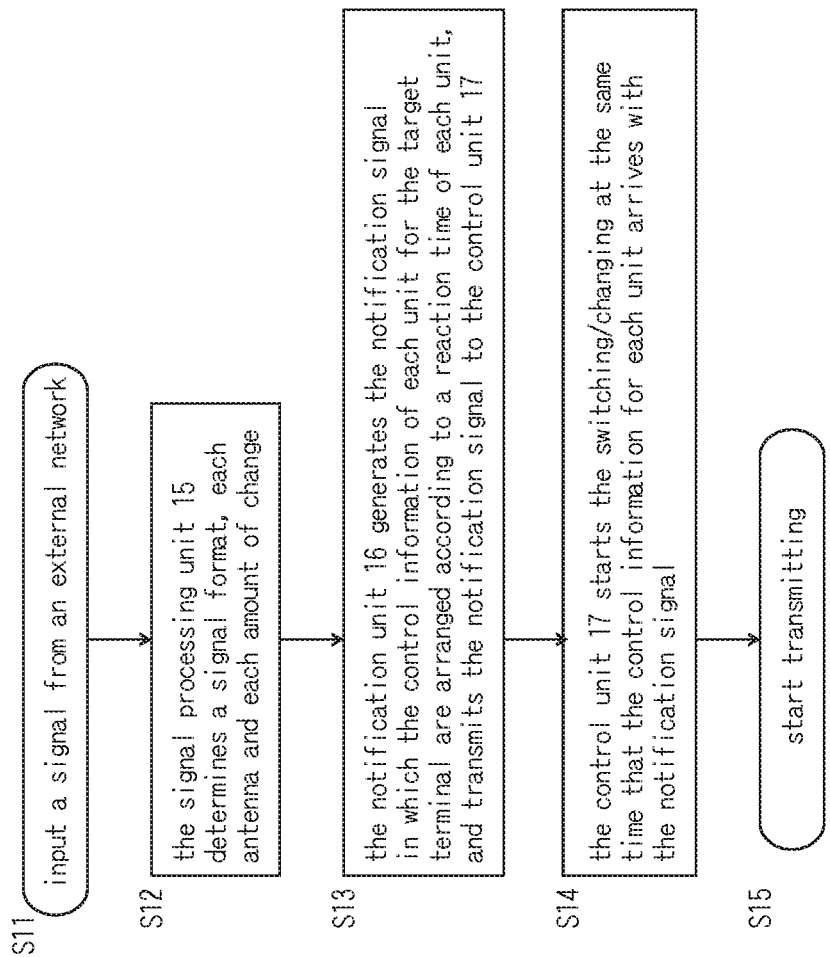
FIG. 2 is a flowchart illustrating a procedure for signal transmission by the base station according to the present invention.

FIG. 2 illustrates a procedure for signal transmission by the base station according to the present invention.

In FIG. 2, when a signal that is transmitted from an external network to the target terminal is input (S11), the signal processing control unit 15 extracts a target terminal for which the transmission signal is destined, determines a signal format in accordance with the target terminal, an antenna to which each of the antenna switch units 12-1 to 12-*n* switches, and an amount of change by each of the signal change units 13-1 to 13-*n*, and notifies the notification unit 16 of a result of the determination (S12). The signal processing control unit 15 retains these pieces of information in state of being associated with the target terminal, but a configuration may be employed in which an external control apparatus that is connected to a network notifies the notification unit 16 of the pieces of information.

At this point, the signal format in accordance with the target terminal corresponds to a SU-MIMO signal that corresponds to one target terminal, an MU-MIMO signal that corresponds to multiple target terminals, a multicast signal, or the like, as each of the signals that are transmitted or received in n antennas to which the antenna switch units 12-1 to 12-*n* switch.

The notification unit 16 generates the notification signal in which the pieces of information for control of switching and changing by each unit that corresponds to the target terminal are arranged according to a reaction time of each unit, and transmits the generated notification signal to the control unit 17 (S13). The control unit 17 starts the control of the switching by each of the antenna switch units 12-1 to 12-*n* and the control of the changing by each of the signal change units 13-1 to 13-*n* at the same time that the control information for each unit, of the notification signal arrives (S14). After the control for the antenna switch units 12-1 to 12-*n* and the signal change units 13-1 to 13-*n* is finished, a signal is transmitted (S15).

In a procedure for signal reception by the base station according to the present invention, steps that are to be performed after the signal processing control unit 15 and the notification unit 16 end signal transmission and then an amount of change for reception for each unit is determined as the control information are the same as those in the procedure for the signal transmission. A reception procedure is established in which the notification signal in which the pieces of control information for the units that correspond to the target terminal are arranged according to the reaction times of the units is generated and the generated notification signal is transmitted to the control unit 17, in which the control unit 17 starts the control of the switching by each of the antenna switch units 12-1 to 12-*n* and the control of the changing by each of the signal change units 13-1 to 13-*n* at the same time that the control information for each unit, of the notification signal arrives, and in which a signal waits to be received after completing such control.

It is noted that the notification unit 16 notifies the control unit 17 of an ending timing of the signal transmission, but the notification unit 16 or the control unit 17 considers the time that a signal takes to start from the transmission and reception units 14-1 to 14-*n* and pass through the antenna switch units 12-1 to 12-*n*.

The point of the present invention is that the reaction time of each of the antenna switch units 12-1 to 12-*n* and the signal change units 13-1 to 13-*n* is considered and that the time to ending of the control for each unit, after which signal transmission or reception is possible, is shortened. This will be described in detail below.

Figure 3:
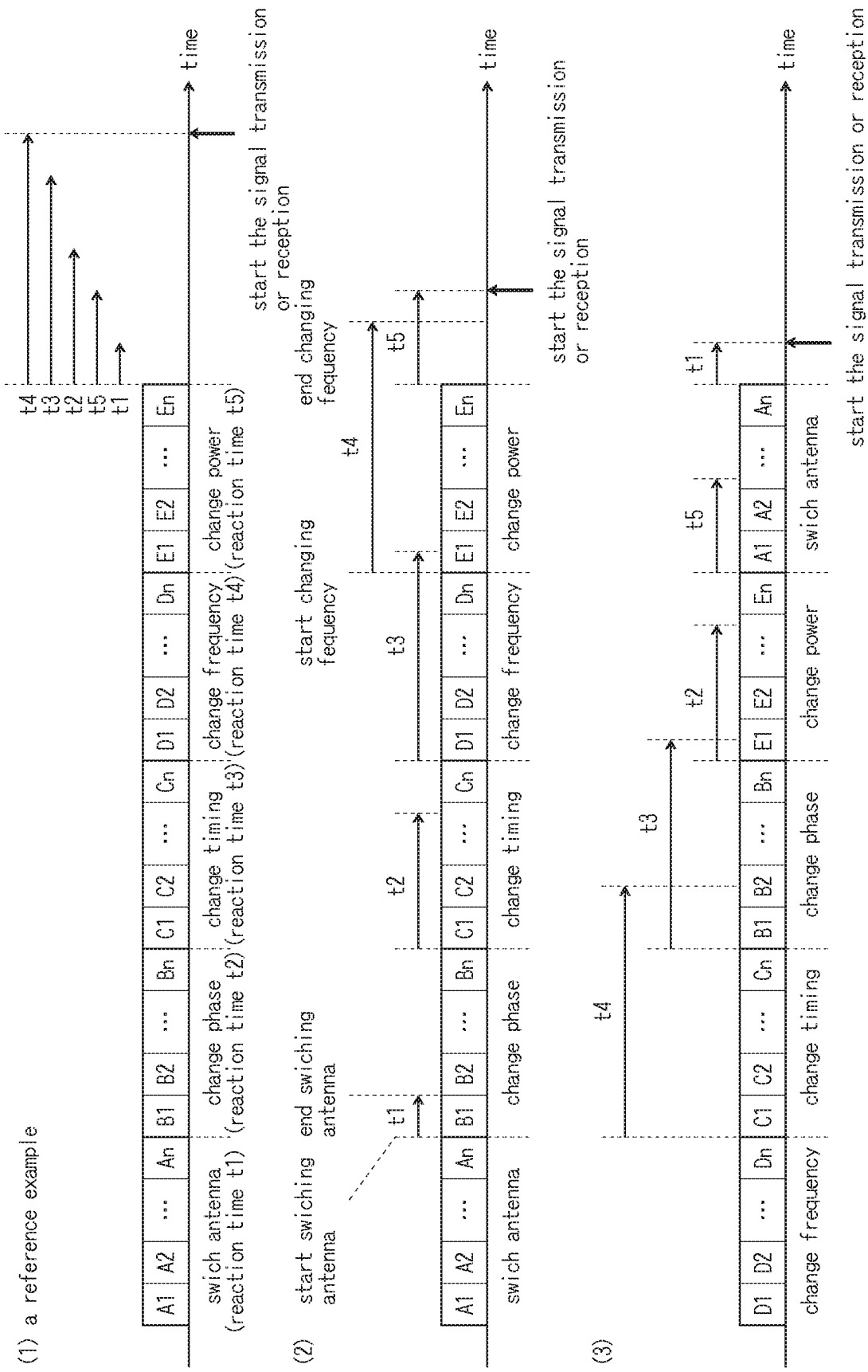
FIG. 3 is a diagram illustrating a first example of a configuration of a notification signal according to the present invention.

FIG. 3 illustrates a first example of a configuration of the notification signal according to the present invention.

In FIG. 3, in the notification signal that is transmitted from the notification unit 16 to the control unit 17, pieces of antenna switch control information A1 to A*n* for the antenna switch units 12-1 to 12-*n*, pieces of phase change control information B1 to B*n* for the signal change units 13-1 to 13-*n*, pieces of timing change control information C1 to C*n*, pieces of frequency change control information D1 to D*n*, and pieces of power change control information E1 to E*n* are arranged on a time axis. The example of the configuration of the notification signal that includes the control information that performs antenna switching and collectively changes a phase, a timing, a frequency, a power of the signal that is transmitted or received in each antenna, using one signal line from the notification unit 16 to the control unit 17 is described here, but the notification signal may be a notification signal that is made up of pieces of control information in accordance with a combination of two or more of the phase, the timing, the frequency, and the power, which are to be changed.

When the notification signal arrives, the control unit 17 analyzes the notification signal into the control information for each of the antenna switch units 12-1 to 12-*n* and the signal change units 13-1 to 13-*n*, and sends resulting pieces of control information to the antenna switch units 12-1 to 12-*n* and the signal change units 13-1 to 13-*n*, respectively. It is assumed that a reaction time of the antenna switch units 12-1 to 12-*n* with respect to the control information is t1, reaction times for the phase, the timing, the frequency, and the power, of each of the signal change units 13-1 to 13-*n* with respect to the control information are t2 to t5, respectively, and that, for example, a relationship among the reaction times is $t1<t5<t2<t3<t4$. That is, as illustrated in a reference example in (1) of FIG. 3, all notification signals arrives in the control unit 17 and then the switching by the antenna switch units 12-1 to 12-*n* and the changing by the signal change units 13-1 to 13-*n* are started all together, the signal transmission or reception is possible after the longest reaction time t4 for frequency changing.

A first feature of the present invention, as illustrated in (2) of FIG. 3, is that at the same time that the control information for each unit, of the notification signal is notified, the control unit 17 sequentially starts the control of the switching by each of the antenna switch units 12-1 to 12-n and the control of the changing by each of the signal change units 13-1 to 13-n. Accordingly, as long as the pieces of control information D1 to Dn for the frequency changing, the reaction time for which is longest do not occupy the last portion of the notification signal, the ending of all switching and changing is advanced and thus starting of the signal transmission or reception can be advanced.

A second feature of the present invention, as illustrated in (3) of FIG. 3, is that the notification unit 16 generates the notification signal in which pieces of control information for the units are arranged in order of decreasing the reaction time. Accordingly, because the pieces of control information A1 to An for antenna switching, the reaction time of which is shortest occupies the last portion of the notification signal, the ending of all changing is reliably advanced and thus the starting of the signal transmission or reception can be advanced.

It is noted that in an example that is illustrated in FIG. 3, the control of the switching by each of the antenna switch units 12-1 to 12-n and the control of the changing by each of the signal change units 13-1 to 13-n are started, as a starting operation, all together, after all n pieces of control information that correspond to all antennas arrive. On the other hand, an operation of controlling each unit may be started with respect to every control information for each antenna. For example, the antenna switch units 12-1 to 12-n may start switching control all together with respect to the pieces of control information A1 to An, and the antenna switch unit 12-1 may start the switching control with respect to the control information A1 and may start the switching control sequentially thereafter.

Figure 4:
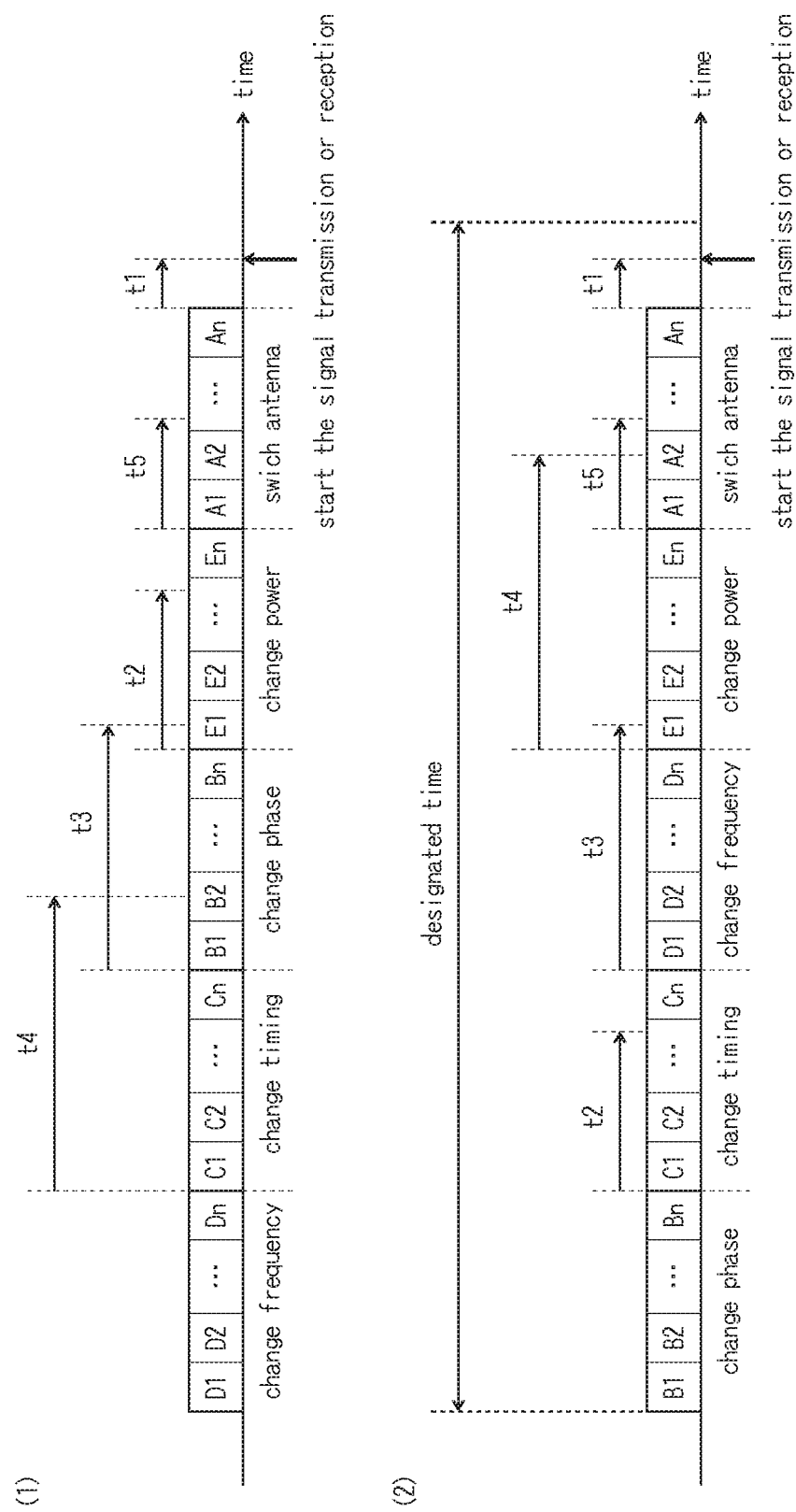
FIG. 4 is a diagram illustrating a second example of the configuration of the notification signal according to the present invention.

FIG. 4 is a second example of the configuration of the notification signal according to the present invention.

(1) of FIG. 4 illustrates an example of (3) of FIG. 3 for comparison.

In (2) of FIG. 4, the notification unit 16 generates the notification signal in which the antenna switch units 12-1 to 12-n and the signal change units 13-1 to 13-n as a whole are arranged in such a manner that operations by the units are controlled to be ended within a designated time. That is, the notification unit 16 may select one from among combinations of notification signals with which the operations by the units are controlled to be ended within the designated time. If a condition that, with a combination of notification signals that is initially found, the operations be finished within the designated time is satisfied, this may be acceptable (First fit). Consequently, as illustrated in (1) of FIG. 4, the pieces of control information D1 to Dn for the frequency changing, the reaction time for which is longest, are not limited to the first portion of the notification signal, or the pieces of control information A1 to An for the switch switching, the reaction time for which is shortest, are not limited to the last portion of the notification signal.

Figure 5:
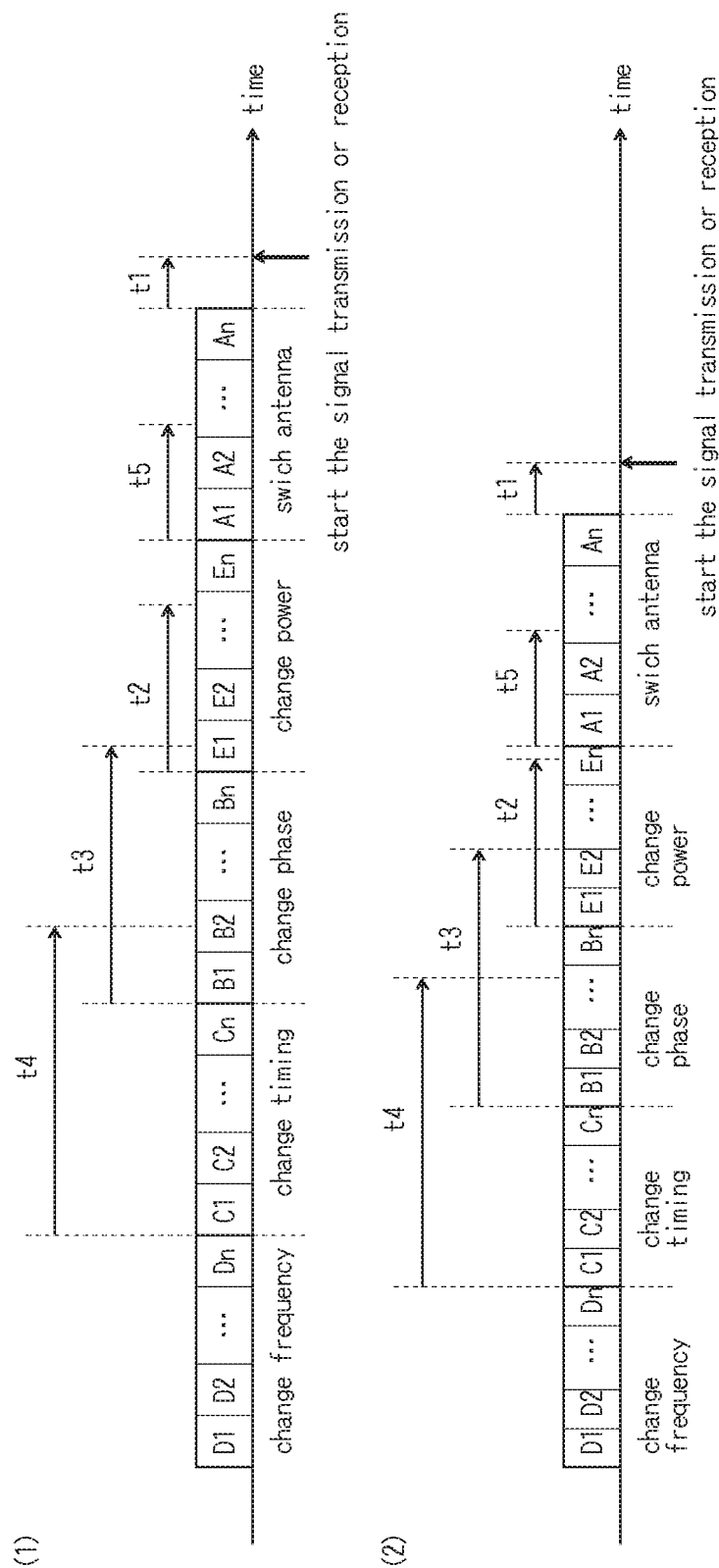
FIG. 5 is a diagram illustrating a third example of the configuration of the notification signal according to the present invention.
Figure 7:
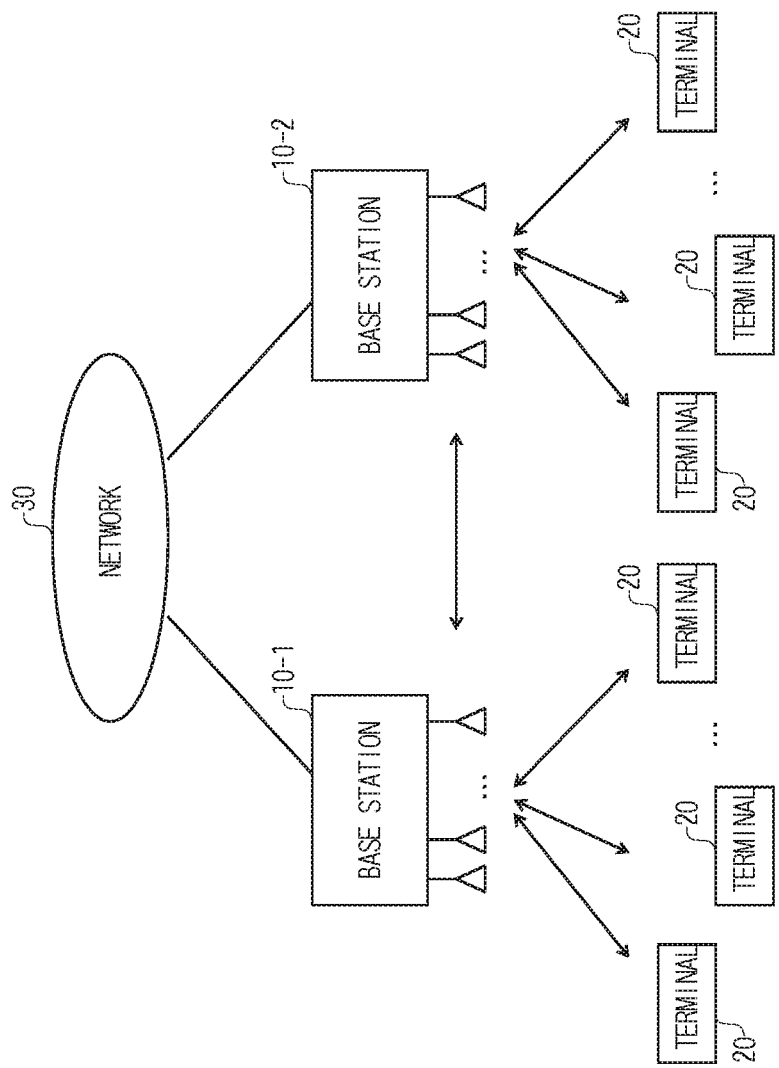
FIG. 7 is a diagram illustrating an example of a configuration of a wireless communication system that is assumed according to the present invention.
Figure 8:
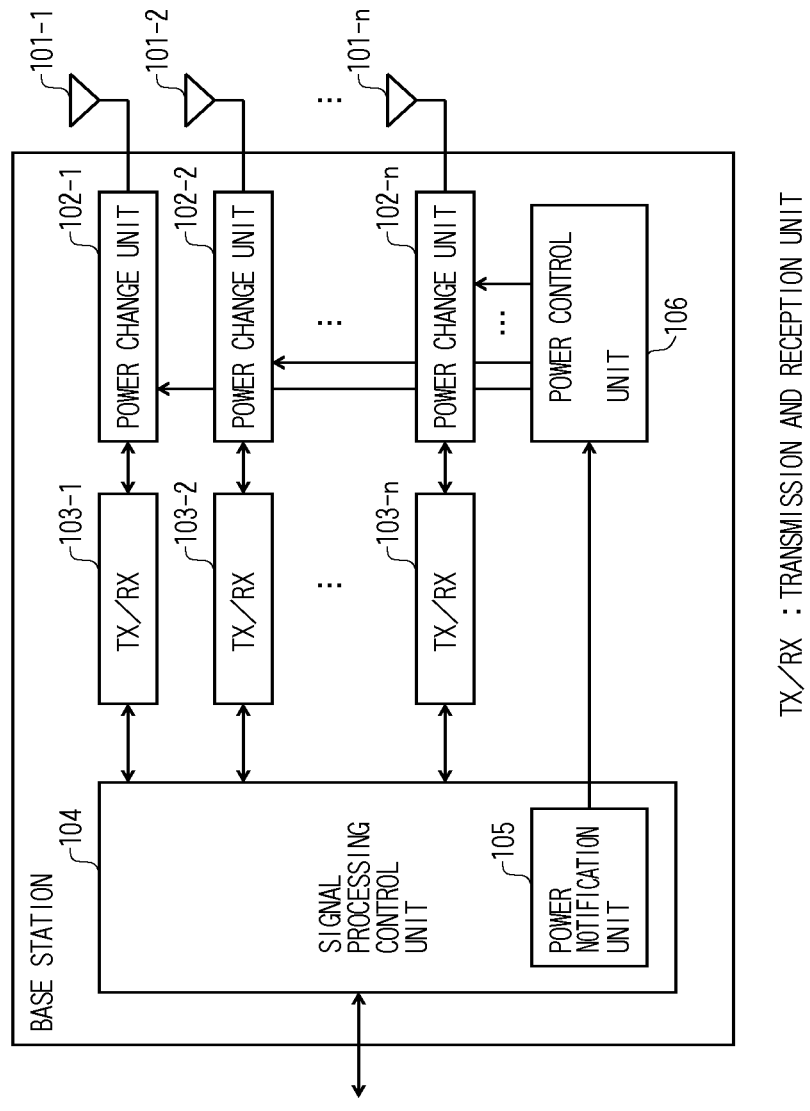
FIG. 8 is a diagram illustrating an example of a configuration of a base station in the related art.

FIG. 5 illustrates a third example of the configuration of the notification signal according to the present invention.

(1) of FIG. 5 illustrates an example of (3) of FIG. 3 for comparison.

In (2) of FIG. 5, a range of control for each of the antenna switch units 12-1 to 12-n and the signal change units 13-1 to 13-n, or resolution is limited, and thus the control information may be shortened, and the time taken for all switching and changing may be shortened. At this point, all pieces of control information for changing other than the pieces of antenna switch control information A1 to An are shortened, but one or several of the pieces of control information may be shortened. Furthermore, for the pieces of antenna switch control information A1 to An, the control information may be shortened by a reduction in the number of antennas. Furthermore, even if the designated time that is designated in FIG. 4 is short, it is possible that this is dealt with by shortening each piece of control information.

FIG. 6 illustrates a fourth example of the configuration of the notification signal according to the present invention.

At this point, it is assumed that each of the signal change units 13-1 to 13-n has a configuration in which multiple devices that differ in terms of the reaction time are connected in a multistage manner, and an example of a configuration of the notification signal that corresponds to a frequency change unit which has a two-stage configuration is illustrated in FIG. 6.

In FIG. 6, control information for a first-stage device of the frequency change unit is defined as D1-1 to Dn-1, and control information for a second-state device as D1-2 to Dn-2, and reaction time t4-1 of the first-stage device is set to be longer than reaction time t4-2 of the second-stage device. For the frequency change unit of each of the signal change units 13-1 to 13-n, arranging pieces of control information D1-1 to Dn-1 for the first-stage device of the frequency change unit, of which the reaction time is long, into the head portion, and starting the frequency changing by the first stage device after the pieces of control information arrive can advance the time for ending all frequency changing, much more than arranging pieces of control information Di-1 and Di-2 for the first-stage device and the second-stage device in a set.

Furthermore, in the example of the configuration of each notification signal that is described above, inspection bits, such as parity check bits or a frame check sequence, may be arranged into the last portion of the communication signal. It is assumed that for each notification signal that is described above, in the control unit 17, at a point in time when n pieces of control information for each of the antenna switch units 12-1 to 12-n and the signal change units 13-1 to 13-n arrive, the switching control or the changing control is started, but, if an error in the notification signal is detected with the inspection bits, the switching control or the changing control that is started in advance may be reset.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to exact construction and operation illustrated and described, and accordingly all suitable modifications and equivalents may be resorted to, falling within the scope thereof.

The invention claimed is:

1. A base station in a wireless communication system in which the base station and one or more terminals share the same frequency channel, the base station comprising:
   n sets of antenna sets, where n is an integer of two or more, each of the antenna sets contains multiple antennas;
   n number of antenna switch units selecting one antenna from each of the antenna sets;
   n number of signal change units each changing a combination of one or more of a phase, a timing, a frequency, and a power of each signal transmitted or received in n number of antennas being selected from the antenna sets, respectively, in the antenna switch units;

a notification unit outputting a notification signal, in which control information on the antenna switch units and the signal change units according to a target terminal being a destination or source of the signals transmitted or received in the n number of antennas, are arranged according to a switch time of each of the antenna switch units and a change time of each of the signal change units, wherein each of the switch time and the change time is referred to individually herein as the reaction time of each unit; and a control unit sequentially starting control of switching by each of the antenna switch units and control of changing by each of the signal change units in order in which the control information on the each unit in the notification signal is notified.

2. The base station according to claim 1, wherein the notification unit is configured to arrange the control information on the each unit in the notification signal in order of decreasing amount of the reaction time of the each unit.

3. The base station according to claim 1, wherein the notification unit is configured to arrange the control information on the each unit in the notification signal so as to end the control of switching by each of the antenna switch units and the control of changing by each of the signal change units within a designated time.

4. The base station according to claim 1, wherein:

the notification unit is configured to reduce an amount of the control information on the each unit in the notification signal; and the control unit, the antenna switch units, and the signal change units are configured to perform the control of switching and the control of changing, which correspond to the reduced amount of the control information.

5. The base station according to claim 1, wherein:

a change unit of at least one of the phase, the timing, the frequency, and the power of the signal change units is configured to connect multiple devices that differ in the reaction time; and the notification unit is configured to sequentially arrange the control information of the each unit in the notification signal starting from the control information on the devices having the longer reaction time.

6. A control method of the base station according to claim 1, the method comprising:

a step causing the base station to extract a target terminal for which a signal input from an external network is destined, and to determine control information based on a signal format according to the target terminal, an antenna to which each of the antenna switch units switches, and an amount of change in the phase, the timing, the frequency, and the power by the each unit of the signal change units;

a step causing the notification unit to generate a notification signal in which the control information on the each unit, which corresponds to the target terminal is arranged according to the reaction time of the each unit, and to transmit the generated notification signal to the control unit; and a step causing the control unit to start the control of switching by the antenna switch units and the control of changing by the signal change units at the same time that the control information on the each unit in the notification signal arrives, wherein a signal is transmitted and received after the controlling of the antenna switch units and the signal change units is finished.

7. The control method of the base station according to claim 6, wherein the notification unit arranges the control information on the each unit in the notification signal in order of decreasing amount of the reaction time of the each unit.

8. The control method of the base station according to claim 6, wherein the notification unit arranges the control information on the each unit in the notification signal so as to end the control of switching by each of the antenna switch units and the control of changing by each of the signal change units within a designated time.

* * * * *